(12) United States Patent
Legendre et al.

(10) Patent No.: US 6,203,277 B1
(45) Date of Patent: Mar. 20, 2001

(54) GYROPLANE ROTOR WITH DOUBLE-PLATE HUB AND EXTERNAL PITCH CONTROL

(75) Inventors: Philippe Maurice René Legendre, Grans; Etienne Jean Rampal, Marseille, both of (FR)

(73) Assignee: Eurocopter (FR)

( * ) Notice: Subject to any disclaimer, the term of this patent is extended or adjusted under 35 U.S.C. 154(b) by 0 days.

(21) Appl. No.: 09/242,218
(22) PCT Filed: Jun. 11, 1998
(86) PCT No.: PCT/FR98/01207
§ 371 Date: May 12, 1999
§ 102(e) Date: May 12, 1999
(87) PCT Pub. No.: WO98/56656
PCT Pub. Date: Dec. 17, 1998

(30) Foreign Application Priority Data

Jun. 13, 1997 (FR) .................................................. 97 07333
Jun. 3, 1998 (FR) .................................................. 98 06949

(51) Int. Cl.$^7$ ...................................................... B63H 3/00
(52) U.S. Cl. ........................................ 416/104; 416/134 A
(58) Field of Search ............................ 416/104, 98, 141, 416/134 A, 170 R, 166 R

(56) References Cited

U.S. PATENT DOCUMENTS

| 3,778,189 | 12/1973 | Ferris . |
|---|---|---|
| 4,304,525 | 12/1981 | Mouille . |
| 4,504,193 | 3/1985 | Mouille . |
| 4,732,540 | 3/1988 | Mouille . |
| 4,737,075 | * 4/1988 | Leman et al. ..................... 416/134 A |
| 5,267,833 | 12/1993 | Mouille . |

FOREIGN PATENT DOCUMENTS

| 0 075 407 | 9/1982 | (EP) . |
|---|---|---|
| 0 250 135 | 6/1987 | (EP) . |
| 20 41 310 | 1/1980 | (GB) . |
| WO93/02916 | 7/1992 | (WO) . |

* cited by examiner

*Primary Examiner*—Edward K. Look
*Assistant Examiner*—Hermes Rodriguez
(74) *Attorney, Agent, or Firm*—Piper Marbury Rudnick & Wolfe

(57) ABSTRACT

A rotorcraft, in particular helicopter, rotor includes a tubular pylon driven in rotation about its axis, which is the rotation axis of the rotor, from its foot. A hub is attached to the pylon by a flared base and includes two annular plates substantially radial to the rotor axis and spaced from each other along the rotor axis so that relative to the pylon one is an axially inside plate and the other is an axially outside plate. Each of at least two blades has its root connected to the hub by retaining and articulation arrangements retained between the plates of the hub and enabling relative angular movement of the blade at least in pitch about a longitudinal blade pitch change axis controlled by displacement by a pitch rod of a pitch lever attached to the blade root. The base has lateral openings through which pass arms of a pitch control plate which rotates with the hub and is mobile at least axially in the base, the end of each arm, outside the base, being articulated to one end of a pitch rod articulated at the other end to the pitch lever of a respective rotor blade.

13 Claims, 6 Drawing Sheets

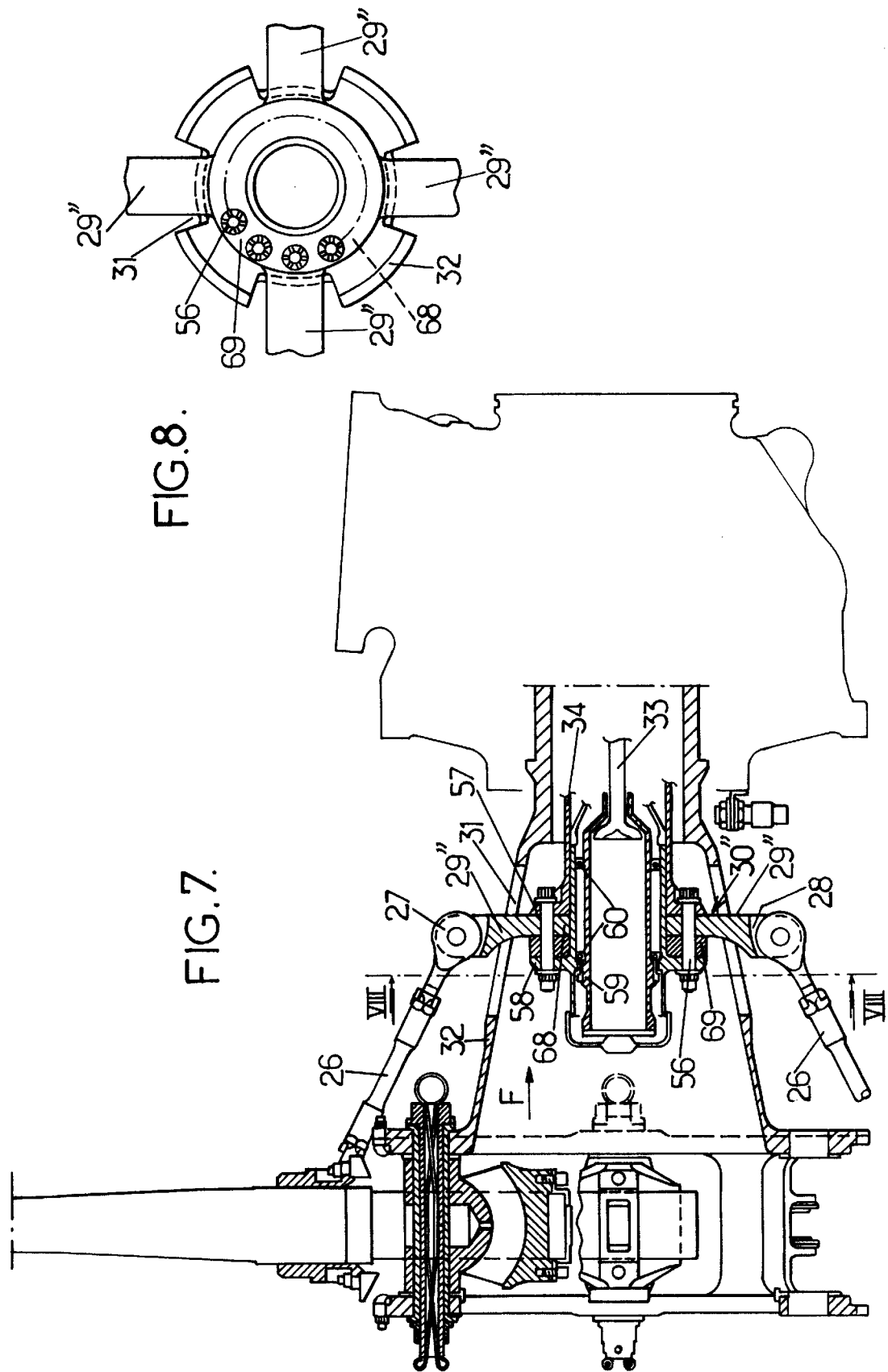

GYROPLANE ROTOR WITH DOUBLE-PLATE HUB AND EXTERNAL PITCH CONTROL

FIELD OF THE INVENTION

The invention concerns rotorcraft rotors, in particular helicopter rotors, that include a dual plate hub with two plates associated with a tubular pylon and a blade pitch control device comprising a pitch rod operating a pitch lever for each rotor blade.

BACKGROUND OF THE INVENTION

The invention relates more particularly to a so-called "articulated" rotorcraft rotor as described in FR 2 456 034, FR 2 516 891 and FR 2 671 049.

The above patents disclose a rotorcraft rotor, such as a helicopter main rotor or tail rotor, which comprises:
  a tubular pylon adapted to be driven in rotation about its axis, which is the rotation axis of the rotor, from its foot,
  a hub attached to the pylon by a flared base and comprising two annular plates substantially radial to the rotor axis and spaced from each other along the rotor axis so that relative to the pylon one is an axially inside plate and the other is an axially outside plate,
  at least two blades each of which has its root connected to the hub by retaining and articulation means retained between said plates of the hub and enabling relative angular movement of the blade at least in pitch about a longitudinal blade pitch change axis and controlled by displacement by a pitch rod of a pitch lever attached to the blade root.

Compared to articulated rotors with a single plate hub, as described in FR 2 427 251, or with an integrated tubular pylon-hub, as described in FR 2 584 996, dual plate hub articulated rotors of the type referred to above have the advantage of improved resistance to centrifugal forces and to shear forces and static and dynamic flapping and drag bending moments for substantially the same overall size, mass and aerodynamic drag.

Like the single plate hub or integrated tubular pylon-hub rotors described in FR 2 427 251 and FR 2 584 996, respectively, the dual plate hub articulated rotors described in FR 2 456 034, FR 2 516 891 and FR 2 671 049 can be equipped with pitch control devices entirely external to the pylon-hub assembly, generally in the case of main rotors, or entirely internal to the tubular pylon and to the hub connection base, generally in the case of tail rotors, or partly internal to the tubular pylon and external to the hub, with a collective pitch control plate usually called the spider plate axially external of the hub, in the particular case of tail rotors.

In pitch control devices entirely external to the pylon-hub assembly the pitch lever of each blade is articulated to one end of a pitch rod external to the base connecting the tubular pylon to the hub and the other end of which is articulated to a pitch control plate that surrounds the rotor pylon, with which this plate is constrained to rotate and around which this plate is mobile at least in the axial direction.

In the case of a main rotor this pitch control plate is generally the rotating plate of a set of cyclic plates in which the rotating plate is rotatably mounted on a non-rotating plate that can be moved in axial translation and inclined in any direction about the axis of the rotor by controls operated by the pilot.

The above pitch control devices are too complex, with too large an overall size around the rotor pylon and too high a mass to be economically transposed to controlling the collective pitch of the blades of a tail rotor, for which all that is required is to move the rotating pitch control plate axially.

For this reason pitch control devices for tail rotors internal to the pylon-hub assembly have been proposed that include a pitch control plate that rotates with the rotor and slides axially inside the base connecting the pylon to the hub, being articulated, for each blade, to a pitch rod that is also internal of the assembly and is itself articulated to a pitch lever on a radial inner armature of the means for retaining each blade on the hub and articulating it thereto, so that the pitch lever is also inside the pylon-hub assembly.

This complicates the structure of the radially inner armature and increases its overall size and its mass, and therefore its cost, as well as increasing the eccentricity of flapping of the rotor and its aerodynamic drag.

What is more, placing the pitch rods inside the pylon-hub assembly complicates maintenance and makes it more costly, in that checking the pitch rod ball joints for play is complicated, as is any work to be carried out on the ball joints in order to replace them.

What is more, the dimensions and therefore the mass and the drag of a tail rotor of the above kind with internal pitch control are further increased if the dimensions of the spherical laminated thrust bearing included in the means for retaining each blade on and articulating it to the hub of an articulated rotor of the above kind must be increased to increase the service life of those units, which accentuates the drawbacks associated with the use of internal pitch controls.

The problem to which the invention is directed is that of remedying the aforementioned disadvantages and proposing an articulated rotor of the type described hereinabove equipped with a pitch control device that is better suited to the various requirements of the art than the prior art devices, in particular for tail rotors.

OBJECT AND SUMMARY OF THE INVENTION

The aim of the invention is therefore to propose a rotor of the type described hereinabove in which the means for retaining the blades on and articulating them to the hub can be dimensioned as required in terms of service life without excessively increasing the eccentricity of the rotor and are combined with a pitch control device which is simple to maintain, in particular in respect of the pitch rod joints, combined with a reduction in mass and aerodynamic drag compared to the prior art.

To this end, in a rotorcraft rotor in accordance with the invention of the type described hereinabove and disclosed in particular in FR 2 671 049 the base has lateral openings through which pass arms of a pitch control plate constrained to rotate with the hub and mobile at least axially in the base, the end of each arm, outside the base, being articulated to one end of a pitch rod articulated at the other end to the pitch lever of a respective rotor blade.

The resulting structure has many advantages: installing the pitch rods outside the pylon and the hub connecting base simplifies maintenance by greatly simplifying checking the rod ball joints for play and replacing them. The radially inner armature of the spherical laminated thrust bearings does not have to support the pitch lever, which can conventionally project laterally from the leading edge or the trailing edge of the blade root, radially outside the hub, and the external position of the pitch rods also significantly reduces the eccentricity of the rotor. Note finally that the external pitch rods of the rotor of the invention are less heavily loaded by centrifugal forces and control forces than prior art internal pitch rods.

To summarize, installing the pitch rods outside the pylon in the rotor of the invention is a significant improvement in terms of mass, aerodynamic drag and direct maintenance costs compared to rotors with the same general architecture but equipped either with internal pitch rods or with a spider plate disposed axially outside the hub and moved axially by means disposed inside the tubular pylon, in which case the pitch rod is replaced by a linkage partly accommodated in the pylon-hub and comprising, externally thereof, a small connecting rod between the pitch lever of each blade and a spider plate arm.

To retain adequate stiffness and adequate strength at the base connecting the tubular pylon to the hub, it is advantageous if the number of lateral openings in the base is equal to the number of blades and each opening has an arm of the pitch control plate passing through it, the openings being equi-angularly distributed in the circumferential direction on the base and each opening being offset in the circumferential direction relative to the retaining and articulation means of the corresponding blade, on the same side of the corresponding blade root as the pitch lever articulated to the pitch rod which is itself articulated to the arm passing through said opening, which advantageously enables favorable alignment of the joints at the ends of each pitch rod in a common radial plane through the rotor axis.

For the pitch control plate and the means that drives it in rotation and in translation in the base and the tubular pylon to have a small overall size in the radial direction, contributing to the reduced aerodynamic drag, mass and cost of the device, the pitch control plate is guided in axial translation in the base and is driven in rotation by a sliding sleeve which is guided in axial translation in and is driven in rotation by the pylon, the sliding sleeve being moved axially by a central pitch control rod extending axially in the sliding sleeve to which said control rod transmits its axial movement through at least one ball thrust bearing, in a manner that is known in itself.

The pitch control plate can take various forms.

In a first embodiment it comprises a one-piece annular plate attached to the sliding sleeve and each arm is removably attached at its radially inside end to the one-piece annular plate with its radially outside end formed as a yoke articulating it to the corresponding pitch rod.

In a second embodiment, each arm with its radially outside end formed as a yoke articulating it to the corresponding pitch rod has its radially inside end formed as an annular plate sector removably fixed against at least one radially outside flange of the sliding sleeve so that all the annular plate sectors attached to the sliding sleeve constitute a substantially complete annular plate forming a pitch control plate around said sliding sleeve.

In a third embodiment the pitch control plate comprises at least two one-piece annular plates axially stacked and removably fixed against at least one radially outside flange of the sliding sleeve, each of the one-piece annular plates having at least two arms projecting substantially radially outwards, offset in the circumferential direction relative to the arms of each other one-piece annular plate and having their radially outside end formed as a yoke articulating them to the corresponding pitch rod.

This embodiment is particularly suitable for rotors with an even number of blades as in this case the pitch control plate advantageously comprises two identical one-piece annular plates each having a number of arms equal to half the number of blades, axially superposed and mounted reversed one against the other so that the centers of the articulations in the yokes at the ends of all the arms are in a common radial plane relative to the rotor axis.

In particular, in the case of a four-blade rotor each of the two identical one-piece annular plates comprises two diametrally opposed radial arms in a cruciform arrangement relative to the two arms of the other one-piece annular plate.

In the above embodiments the components of the pitch control plate are easy to fit and to remove, to facilitate maintenance operations. In the second and third embodiments, as the components forming the pitch control plate are not in one piece with the sliding sleeve, the pitch control plate is advantageously fixed between two annular flanges projecting radially outwards, one on the sliding sleeve and the other on a tubular end-piece set into the axially outside end of the sliding sleeve.

As described in the aforementioned patents describing dual plate hubs, the means retaining each blade to and articulating it on the hub preferably and advantageously comprise two rigid armatures one of which, in a radially outside position relative to the rotor axis, is fixed between the two plates of the hub and the other of which, at a radially inside position, is coupled to the corresponding blade root to move with it. This architecture makes the hub extremely rugged and compact, so that it has low drag, and this is achieved with a simple structure.

In this case, to reduce mass and to further reduce the front surface area of the rotor, in addition to the advantages procured by the external position of the pitch rods, the root of each blade is advantageously coupled to move with the corresponding radially inside armature by a rigid loop attached to the blade root and continuously surrounding the retaining and articulation means, being attached to their radially inside armature, as disclosed in FR 2 516 891 and FR 2 671 049.

However, it is of course equally possible for the root of each blade to be connected to the corresponding radially inside armature by a forked part or an open yoke attached to the blade root and the two branches of which terminate in radially inside extremities between which the corresponding radially inside armature is mounted in a spacer-like manner, as disclosed in FR 2 456 034.

In the former case the blade root's rigid loop can be part of the strong framework of the blade or the loop of an intermediate sleeve connected to the corresponding blade root by an external yoke, as described in FR 2 671 049.

Whether the rigid loop is part of a blade root sleeve or not, it is advantageous for a sleeve of the above kind to surround the root of each blade and to be attached to the root, so that the pitch lever on each blade can project laterally from the sleeve, on one side of the pitch axis, whereas a fitting for a drag damper, also known as a frequency adapter or spring return strut with built-in drag damping, projects laterally from the sleeve, on the other side of the pitch axis of the corresponding blade, for inter-blade coupling of the drag dampers, in particular in the case of a main rotor, or for conventional coupling of each drag damper between the root of a blade and the hub, in particular in the case of a tail rotor.

In both cases the rotor advantageously further comprises, for each blade, a flapping abutment device with direct bearing engagement of inside abutments on the same side as the pylon and outside abutments on the side opposite the pylon and mounted on the blade root, and advantageously fixedly or removably mounted (retractable in flight by centrifugal force) on a blade root sleeve, against respective inside and outside abutments mounted on the hub, also fixedly or retractably in flight, respectively to limit negative and positive flapping of the blade, the inside and outside flapping abutments of the hub being disposed on radially outside edges, relative to the rotor axis, of the inside and outside plates of the hub, respectively, in the parts of said plates between which are housed said means retaining the blades to and articulating them on the hub.

Other features and advantages of the invention will emerge from the description of embodiments of the invention given hereinafter by way of non-limiting example and with reference to the accompanying drawings.

BRIEF DESCRIPTION OF THE DRAWINGS

FIG. 3a is a diagrammatic perspective view of one arm of the pitch control plate of the rotor from FIGS. 1 to 3.

FIG. 7 is a partial axial section of another variant with a third example of pitch control plate.

FIG. 8 is a view in the direction of the arrow F in FIG. 7.

DETAILED DESCRIPTION

Figure 1:
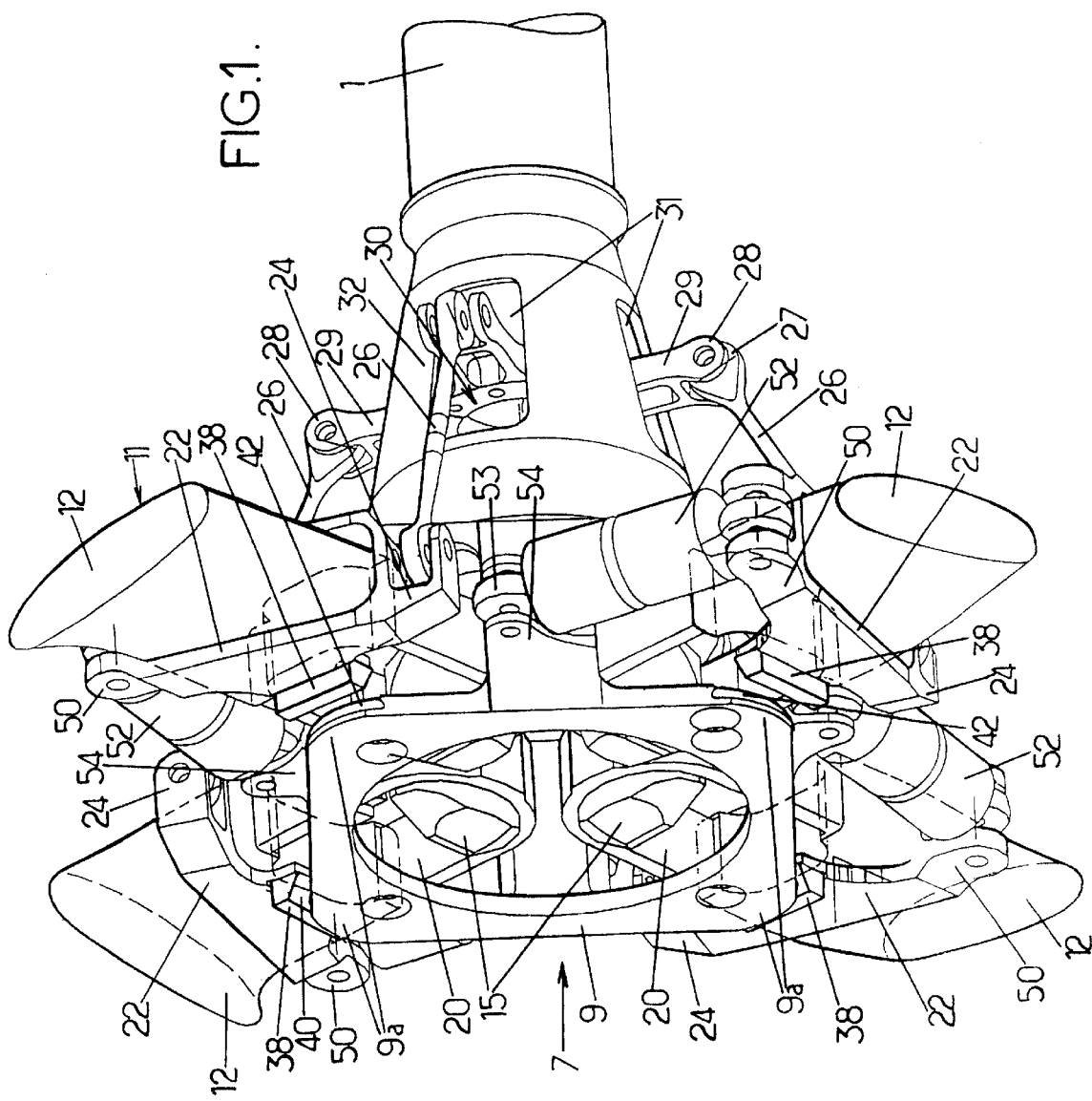
FIGS. 1 and 2 are diagrammatic perspective views, respectively an external lateral view in FIG. 1 and an internal lateral view in FIG. 2, of a four-blade helicopter tail rotor head.
Figure 2:
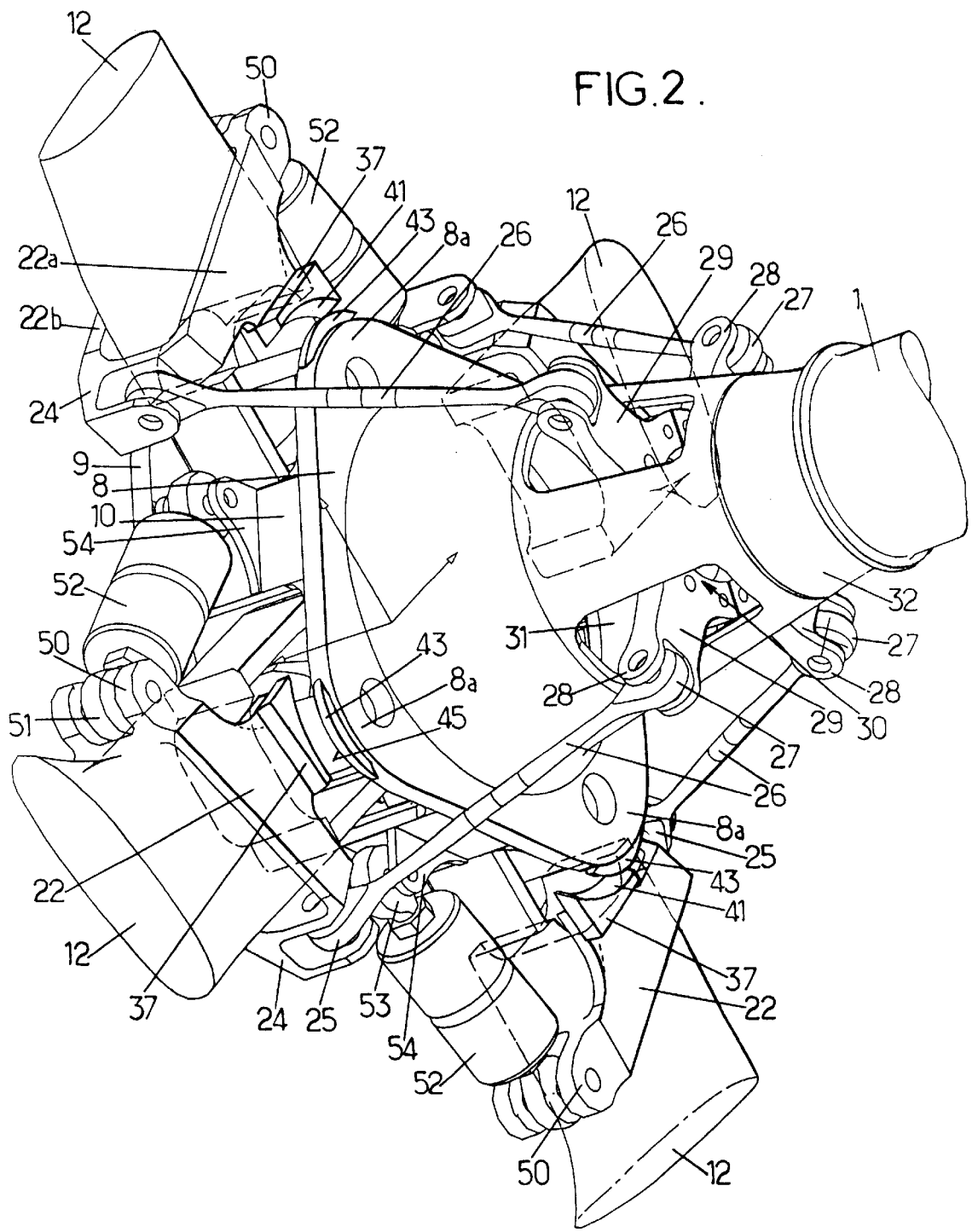
Figure 3:
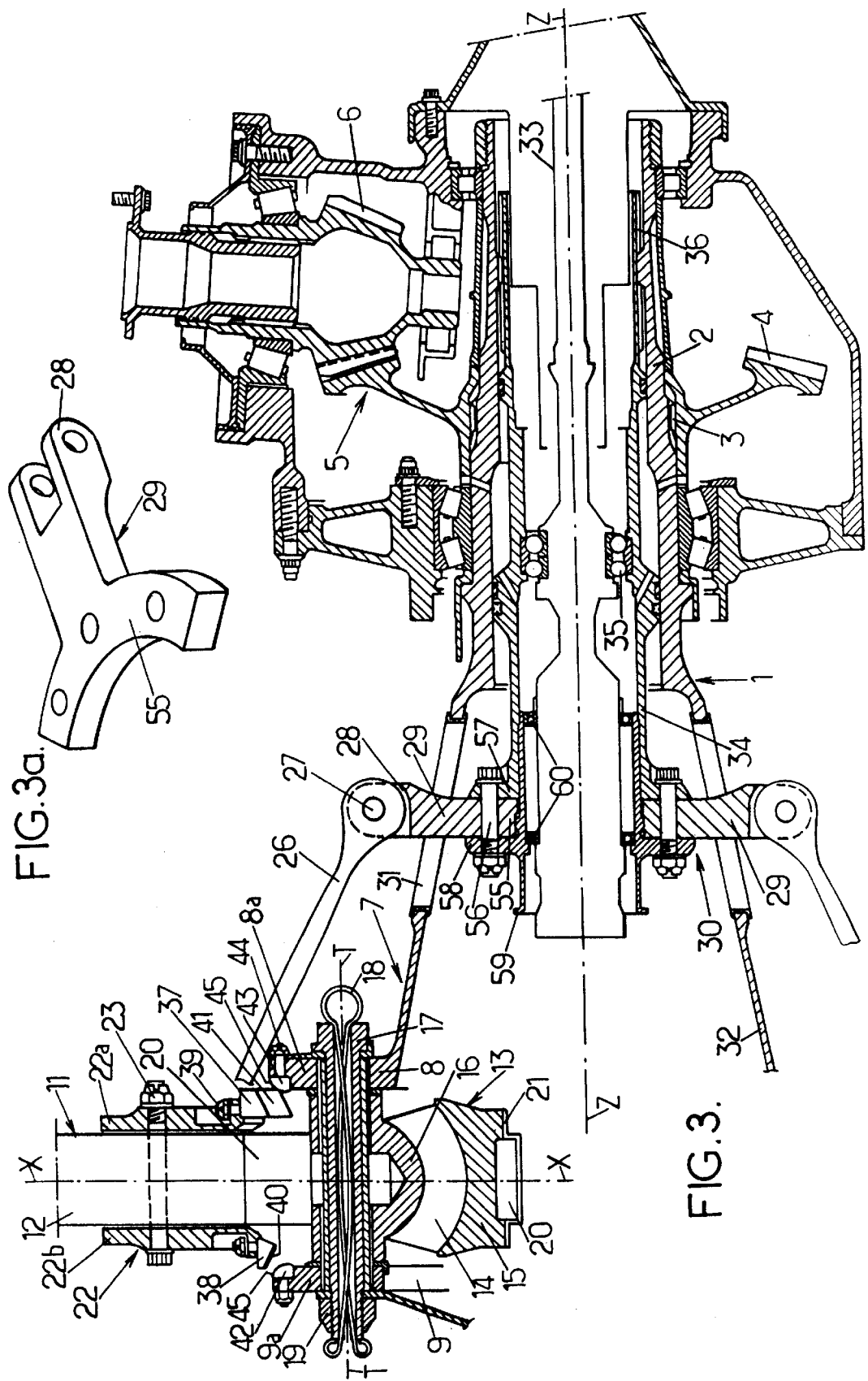
FIG. 3 is a diagrammatic partial axial section of the rotor from FIGS. 1 and 2.

The general architecture of the four-blade helicopter tail rotor head shown in FIGS. 1 to 4 conforms to the teaching of FR-A-2 671 049, to which reference should be had for more information on the various components of the rotor head, and the description of which is hereby incorporated into this description by reference, except for the technical specifications which are specific to the rotors of the invention and therefore different from corresponding components or units in the rotors disclosed by the aforementioned patent.

The rotor from FIGS. 1 through 4 includes a tubular pylon 1 driven in rotation about its longitudinal axis Z—Z, which is the rotation axis of the rotor, by its foot 2 which has external axial splines 3 engaging with internal splines on the output gear 4 of a bevel gear pair 5 the input gear 6 of which is driven in rotation by a transmission shaft (not shown) connected to the main gear box of the helicopter, in a manner which is well known in itself.

Figure 4:
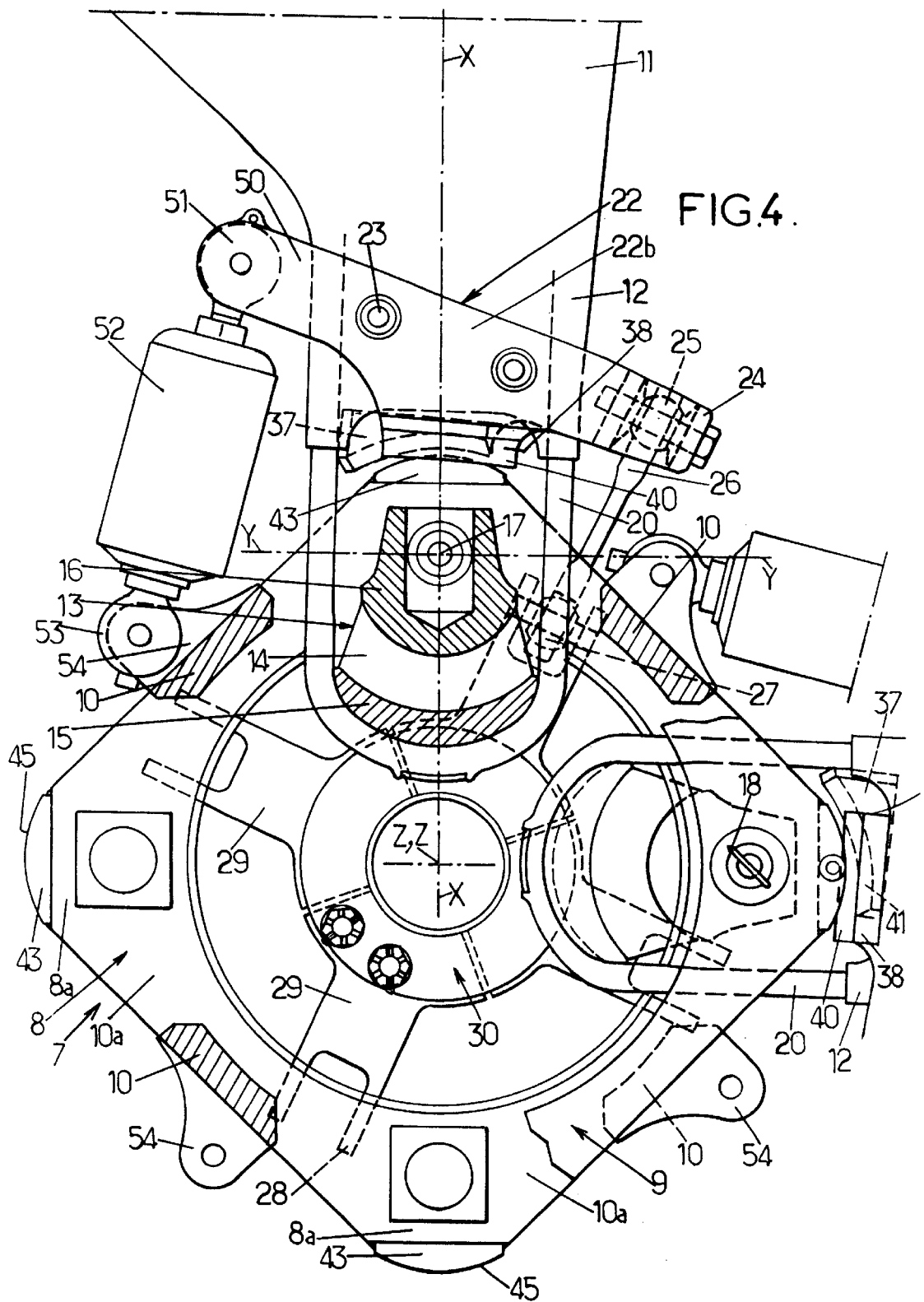
FIG. 4 is a diagrammatic partial view, partly in cross-section and partly in lateral elevation, of the rotor from FIGS. 1 to 3 with a first example of pitch control plate.

On the side opposite its foot 2 the pylon 1 is constrained to rotate with a hub 7. The hub 7 is of the type comprising two parallel hub plates 8 and 9 which are substantially perpendicular to the rotor axis Z—Z, axially spaced from each other by an axial annular wall 10 (see FIG. 4) and have the same shape in plan view, i.e. a polygon with rounded corners, there being as many corners as there are blades in the rotor. In this example, the tail rotor being a four-blade rotor, each of the hub plates 8 and 9 is a square ring with four rounded corners and a circular central opening (FIG. 4).

The plate 8 on the same axial side as the pylon 1 is called the inside plate because it is on the same side as the structure of the rear part of the helicopter on which the tail rotor rotates. The other plate 9 is called the outer plate.

Each blade 11 of the rotor is connected by its root 12 to the hub 7 by means of a single retaining and articulation member in the form of a spherical laminated thrust bearing 13 the design of which is well known in itself.

Each of the spherical laminated thrust bearings 13 has a central part 14 made up of an alternating stack of elastomer layers and rigid cups, generally metal cups, in the shape of spherical domes, the central part 14 being bonded between two rigid armatures 15 and 16 in respective radially inside and outside positions relative to the rotor axis Z—Z. In a manner that is known in itself the central part 14 has its convex radially inside face bonded to the concave radially outside face of the inside armature 15, which has a corresponding shape, and its concave radially outside face bonded to the convex radially inside face of the outside armature 16, which has a corresponding shape. The outside armature is fixed in a spacer-like fashion between two facing rounded corners 8a and 9a on the hub plates 8 and 9 by means of a bolted connecting pin 17 passing through aligned holes in the outside armature 16 and the rounded corners 8a and 9a and which is a tubular pin having an elastic safety pin 18 passed through it to retain a nut 19 screwed onto the screwthreaded end of the pin 17 projecting externally of the outside plate 9.

The spherical laminated thrust bearing 13 retained in this way between the two plates 8 and 9 of the hub 7 by its outside armature 16 is connected to the blade root 12 by an attachment consisting of a rigid loop 20 attached to the blade root 12 and surrounding the spherical laminated thrust bearing 13, being built into a housing in the radially inside face (relative to the axis Z—Z) of the inside armature 15 and held in position by a plate 21 screwed onto the inside armature 15. The loop 20 and the spherical laminated thrust bearing 13 are housed in an opening 10a in the wall 10 connecting the two hub plates 8 and 9, the opening 10a being formed between the rounded corners 8a and 9a, between which the thrust bearing 13 and the loop 20 are also accommodated. The dimensions of each of the four openings 10a in the wall 10 are sufficient to allow relative angular movement of the inside armature 15 and the loop 20 attached to the root 12 of the blade 11 in pitch, flapping and drag, respectively around a pitch axis, a flapping axis and a drag axis that are perpendicular in pairs and converge at the articulation center of the spherical laminated thrust bearing 13, the articulation center being geometrically situated on the same side as the outside armature 16, for example on the axis of the pin 17. The pitch axis X—X is a longitudinal axis of the blade 11 and is substantially radial relative to the axis Z—Z and the flapping axis Y—Y is perpendicular to the axes Z—Z and X—X. The drag axis T—T is substantially parallel to the rotor axis Z—Z.

As described in FR-A-2 671 049 the rigid blade attachment loop 20 continuously surrounding the spherical laminated thrust bearing 13 whose inside armature 15 is built into the interior of the loop 20, can have a composite structure made up of rovings of mineral or organic reinforcing fibers held together by a synthetic stiffener resin and attached to the framework of the blade 11, extending one or more bundles of rovings constituting the spar(s) of the blade 11.

The pitch of each blade 11 is controlled by a fitting arranged as a sleeve 22 around the blade root 12 and fixed thereto by two bolted connections 23 through the blade root 12 and the inside and outside plates 22a and 22b of the sleeve 22. The sleeve 22 has, projecting laterally forwards from the leading edge of the blade root 12, a yoke 24 constituting a pitch lever radially outside the plates 8 and 9 and in which is retained a ball joint 25 at the axially outside end of a pitch rod 26, the axially inside end of which is also retained by a ball joint 27 in a yoke 28 at the radially outside end, relative to the rotor axis Z—Z, of an arm 29 of a collective pitch control plate 30 for the blades 11 of the tail rotor.

Each of the arms 29, the number of which is equal to the number of blades in the rotor, passes radially through a respective one of the same number of windows 31 in a frustoconical base 32 that converges towards the pylon 1 and connects the latter to the two plates 8 and 9 and to the partition 10 of the hub 7. The four windows 31 are equiangularly distributed around the periphery of the frustoconical base 32 and (see FIG. 4) are slightly offset in the circumferential direction relative to the spherical laminated thrust bearings 13 so that the radial arms 29 can be connected to the pitch levers 24 outside the frustoconical base 32 by the pitch rods 26, the ball joints 25 and 27 of each of which are substantially centered in a common radial plane through the axis Z—Z and which are easily accessible for visual inspection or maintenance because they are on the outside of the assembly of the pylon 1, the base 32 and the hub 7.

Inside the base 32 the control plate 30 and its arms 29 can simultaneously rotate with the pylon 1 and move along the rotor axis Z—Z over an axial travel corresponding to the maximum pitch range, to which the axial dimensions of the windows 31 in the base 32 are tailored. In a manner that is known in itself axial movements of the plate 30 in the base 32 are controlled by a collective pitch control rod 33 which is in turn moved by actuator means (not shown) such as a mechanical transmission unit with a direction changing device or a yaw servocontrol actuator. The control rod 33 extends axially inside a sliding sleeve or slide with splines 34 connected to the plate 30 and to which the rod 33 transmits its axial movement via a double ball thrust bearing 35 fitted between the central control rod 33 and the sliding sleeve 34, driven in rotation by the pylon 1 and in the latter by external axial splines 36 meshing with internal axial splines on the pylon 1, enabling axial movement of the sliding sleeve 34 relative to the pylon 1, in an arrangement that is well known in itself.

Various embodiments of the control plate 30 and its connection to the sliding sleeve 34 are described hereinafter with reference to FIGS. 3 through 8.

To limit negative flapping (inwards or towards the pylon 1) of each blade 11 about its flapping axis Y—Y when the rotor is stopped and at low rotor rotation speeds and to limit positive flapping (outwards or away from the pylon 1) of each blade 11 the rotor comprises, for each blade 11, a flapping abutment device with direct bearing engagement of fixed inside and outside abutments attached to the blade root 12 against respective inside and outside abutments fixed to the hub 7.

For each blade 11 the flapping abutment device comprises an inside abutment 37 and an outside abutment 38 each of which is a shoe fixed by screws 39 and projecting radially inwards relative to the rotor axis Z—Z from the respective radially inside edge of the inside plate 22a and the outside plate 22b of the sleeve 22. The two abutment shoes 37 and 38 therefore occupy fixed positions relative to the blade 11. Each of the abutments shoes 37 and 38 has a bearing surface 40 or 41 substantially transverse to the corresponding pitch axis X—X and inclined to that axis and to the rotor axis Z—Z so as substantially to face the radially outside edge (relative to the rotor axis Z—Z) of the rounded corner 8a or 9a of the facing hub plate 8 or 9.

An outside flapping abutment 42 and an inside flapping abutment 43 facing the bearing surfaces 40 and 41 of the outside and inside abutment shoes 38 and 37 of each blade 11 are fixed to the hub 7 and each is built into the radially outside edge (relative to the axis Z—Z) of the corresponding rounded corner 9a or 8a and held in position by screws 44. Each of the hub flapping abutments 42 and 43 is a shoe having substantially the shape of a quarter-torus segment having a bearing surface 45 which is a portion of a toroidal surface with the convex side facing towards the facing inside or outside flapping abutment shoe 37 or 38 on the sleeve 22 of the corresponding blade 11 and the toroidal surface is also a quarter-circle curve with the convex side facing radially outwards relative to the rotor axis Z—Z and precisely centered on the drag axis T—T of the corresponding blade 11.

As an alternative to the above the flapping abutments can be mobile on their support, namely the sleeve 22 and/or the plates 8 and 9 of the hub 7, and retractable in flight by centrifugal force.

As also disclosed in FR-A-2 671 049, each sleeve 22 has another yoke 50 projecting laterally from the side opposite the pitch lever 24 and retaining a ball joint 51 at one end of a drag damper 52 the other end of which is retained by another ball joint 53 on a support 54 fixed to and projecting laterally outwards from a wall portion 10 between two adjoining openings 10a in the wall 10 to accommodate spherical laminated thrust bearings 13 and corresponding loops 20 of two adjacent rotor blades.

In FIGS. 1 through 4 the pitch control plate 30 has the same number of identical arms 29 as the rotor has blades 11 and each arm 29 has its radially external end part (relative to the axis Z—Z) in the form of a yoke 28 articulating it to the pitch rod 26 and its radially inside end part in the form of an annular plate sector 55 subtending an angle at the center of approximately 360°/n where n is the number of blades 11. In this example n=4 and the annular plate sector 55 is substantially one quarter of a circular ring (see FIG. 3a). The arms 29 are removably attached and each fixed by three axial bolts 56 between an annular flange 57 projecting radially outwards from the axially outside end of the sliding sleeve 34 and another annular flange 58 projecting radially outwards from a tubular end-piece 59. The end-piece 59 is set coaxially into the axially outside end part of the sliding sleeve 34 and is attached to the sleeve 34 and arms 29 rotating about the axis Z—Z by bolts 56, two roller bearings 60 guiding its rotation about the axially outside end part of the central pitch control rod 33. The arms 29 are mounted side by side (see FIG. 4) so that their annular plate sectors 55 bolted between the flanges 57 and 58 constitute a practically complete annular plate forming the pitch control plate 30 around the sliding sleeve 34.

Figure 6:
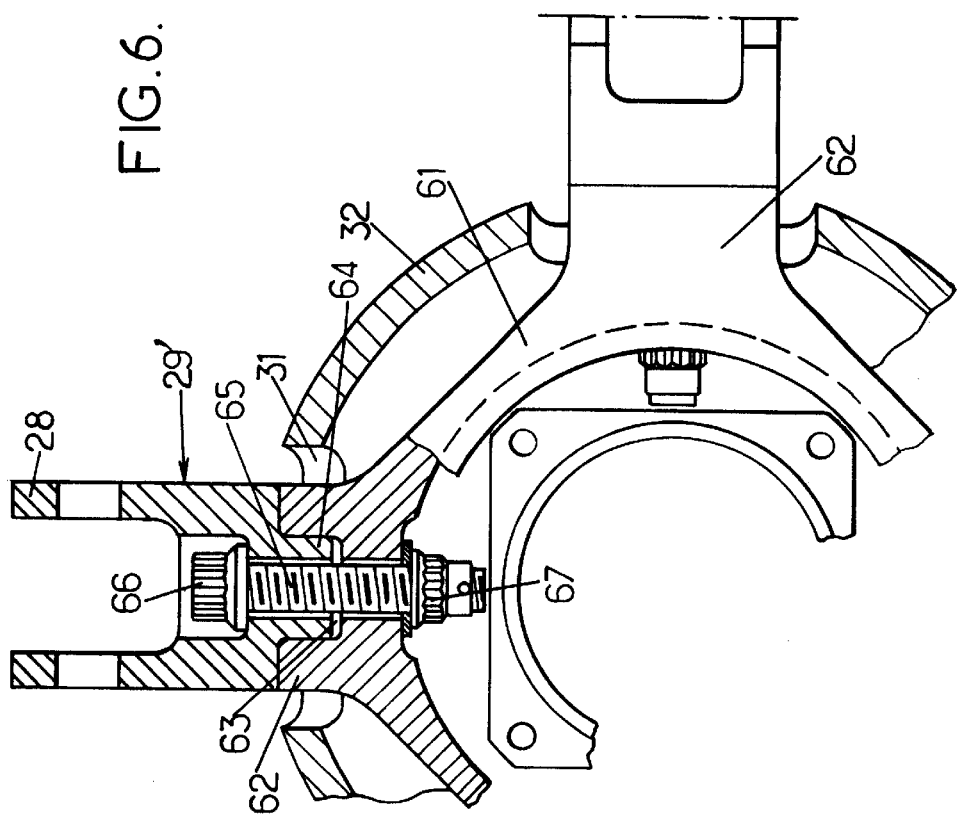
FIGS. 5 and 6 are partial views in axial and in radial section, respectively, of a variant with a second example of pitch control plate.
Figure 5:
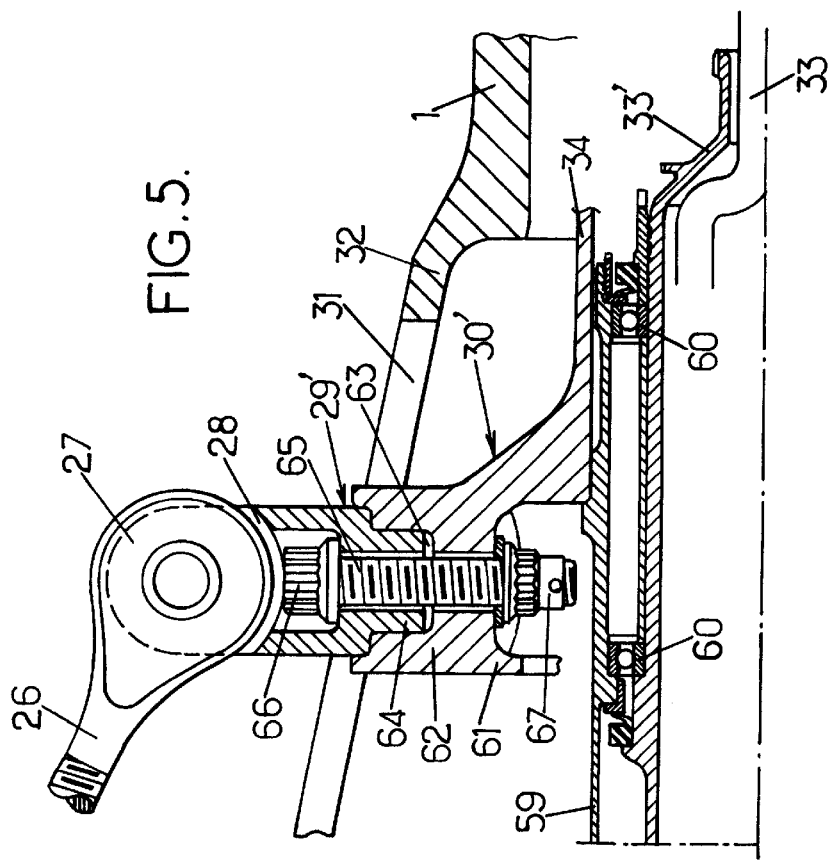

In the embodiment shown in FIGS. 5 and 6, which differs from the rotor shown in FIGS. 1 to 4 only in terms of the structure of the pitch control plate, this plate 30' comprises a one-piece annular plate 61 projecting radially outwards around the sliding sleeve 34 and in one piece with the sleeve 34, the plate 61 of which constitutes the axially outside end part. The plate 61 has the same number of radially outside appendices 62 equiangularly distributed in the circumferential direction around the axis Z—Z as the rotor has blades 11, and therefore arms 29', and each appendix 62 has a radial recess 63 opening radially outwards into which is set a radial end-piece 64 constituting the radially inside end part of a corresponding arm 29' the radially outside end part of which is formed as a yoke 28 articulating it to the corresponding pitch rod 26, as previously.

The identical arms 29' are each removably fixed to the plate 61 by a radial bolt 65 passing through the bottom of the yoke 28 and the end-piece 64 of the arm 29' and the corresponding appendix 62 of the plate 61 in the bottom of the corresponding recess 63, the head 66 of the bolt 65 being housed in a recess in the bottom of the yoke 28, and the nut 67 on the bolt 65 is radially inside the annular plate 61 and around the tubular end-piece 59 which, in this example, is set coaxially into the sliding sleeve 34. Roller bearings 60 guide its rotation around an axially outside tubular end 33' of the central pitch control rod 33.

In the embodiment shown in FIGS. 7 and 8, which also differs from the rotor shown in FIGS. 1 through 4 only in terms of the construction of the pitch control plate, this plate 30" comprises two identical one-piece annular plates 68 and 69 each of which is in one piece with two identical radial arms 29" diametrally opposed relative to the center of the annular plate 68 or 69 concerned, the radially outside end part of each arm 29" being formed as a yoke 28 articulating it to the corresponding pitch rod 26.

The annular parts of the two plates 68 and 69 are axially superposed, the two arms 29" of one of them being oriented in a direction perpendicular to the two arms 29" of the other one so that the four arms 29" are in a substantially cruciform arrangement. The arms 29" projecting radially outwards on each of the plates 68 and 69 are therefore offset circumferentially relative to the arms 29" of the other one-piece annular plate 69 or 68.

In order for the centers of the ball joints 27 retained in the yokes 28 of all the arms 29" of the two plates 68 and 69 to be in the same radial plane, which is the plane of contact between the two plates 68 and 69, the yokes 28 are slightly offset axially relative to the median radial plane of each annular plate 68 or 69 and its arms 29" and the two plates 68 and 69 are superposed axially by being mounted reversed one against the other. The plates 68 and 69, each of which has a number of arms 29" equal to half the even number of blades 11, are removably fixed by axial bolts 56 between the respective radially outside annular flanges 57 and 58 of the sliding sleeve 34 and of the tubular end-piece 59, as described hereinabove for the example of FIGS. 1 to 4 (see FIG. 3).

If the rotor from FIGS. 7 and 8 has six blades, each of the two annular plates 68 and 69 can have three radial arms like the arms 29" oriented at 120° to each other and each offset 60° in the circumferential direction relative to the arms 29" of the other plate 69 or 68 if the two plates are fixed back to back and reversed one against the other.

It is possible to stack axially three annular plates each carrying two arms like the diametrally opposite arms 29".

However, only the two outside plates of the stack are identical, the central plate being different because the yokes 28 at the ends of its arms 29" are centered in the median radial plane of the annular plate whereas the yokes of the other two annular plates are offset axially by a distance such that their center is in the median radial plane of the central annular plate. An embodiment of this kind with three superposed annular plates, although possible, is undesirable because of its high mass and overall size, and because its structure is asymmetric and ill-balanced.

In the above examples the pylon 1, the hub 7 with its plates 8 and 9 and its wall 10 and the base 32 form a one-piece tubular pylon-hub assembly constituting a single metal, preferably titanium, component providing an inside free space that can be used for electrical conductors of a device for defrosting or preventing frost forming on the blades 11 and the hub 7 and each rigid blade attaching loop 20 is formed directly from the corresponding blade root 12.

However, the invention is not limited to this embodiment and, as described in FR-A-2 671 049, the pylon 1 and the various parts of the hub 7 can be made of metal or composite materials and bolted together and/or each spherical laminated thrust bearing retaining and articulating a blade can be connected by its inside armature to the root of that blade either directly through a forked part of the blade root or through the intermediary of a sleeve with an external yoke in which the blade root can be retained by two pins, in a manner that is well known in itself.

The connection between each blade and the corresponding spherical laminated thrust bearing can also be provided by a sleeve with a blade root connecting yoke and having the rigid loop 20 around the spherical laminated part. The drag dampers can also be mounted as inter-blade tie rods.

What is claimed is:

1. A rotorcraft, in particular helicopter, rotor comprising:
a tubular pylon adapted to be driven in rotation about its axis (Z—Z), which is the rotation axis of said rotor, from its foot,
a hub attached to said pylon by a flared base and comprising two annular plates substantially radial to said rotor axis (Z—Z) and spaced from each other along said rotor axis (Z—Z) so that relative to said pylon one is an axially inside plate and the other is an axially outside plate,
at least two blades each of which has its root connected to said hub by retaining and articulation means retained between said plates of said hub and enabling relative angular movement of said blade at least in pitch about a longitudinal blade pitch change axis (X—X) and controlled by displacement by a pitch rod of a pitch lever attached to said blade root, said base has lateral openings through which pass arms of a pitch control plate constrained to rotate with said hub and mobile at least axially in said base, the end of each arm, outside said base, being articulated to one end of a pitch rod, the pitch rod having another end articulated at said pitch lever of a respective rotor blade said pitch control plate is guided in axial translation in said base and driven in rotation by a sliding sleeve which is guided in axial translation in and is driven in rotation by said pylon, said sliding sleeve being moved axially by a central pitch control rod extending axially in said sliding sleeve to which said rod transmits its axial movement through at least one ball thrust bearing.

2. A rotor according to claim 1 wherein the number of lateral openings in said base is equal to the number of blades and each opening has an arm of said pitch control plate passing through it, said openings being equi-angularly distributed in the circumferential direction on said base and each opening being offset in said circumferential direction relative to the retaining and articulation means of the corresponding blade, on the same side of the corresponding blade root as the pitch lever articulated to the pitch rod which is itself articulated to said arm passing through said opening.

3. A rotor according to claim 1 wherein said pitch control plate comprises a one-piece annular plate attached to said sliding sleeve and each arm is removably attached at its radially inside end to said one-piece annular plate with its radially outside end formed as a yoke articulating it to the corresponding pitch rod.

4. A rotor according to claim 1 wherein each arm with its radially outside end formed as a yoke articulating it to the corresponding pitch rod has its radially inside end formed as an annular plate sector removably fixed against at least one radially outside flange of said sliding sleeve so that all said annular plate sectors attached to said sliding sleeve constitute a substantially complete annular plate forming a pitch control plate around said sliding sleeve.

5. A rotor according to claim 1 wherein said pitch control plate comprises at least two one-piece annular plates axially stacked and removably attached to at least one radially outside flange of said sliding sleeve, each of said one-piece annular plates having at least two arms projecting substantially radially outwards, offset in the circumferential direction relative to the arms of each other one-piece annular plate and having their radially outside end formed as a yoke articulating them to the corresponding pitch rod.

6. A rotor according to claim 5 including an even number of blades and wherein said pitch control plate comprises two identical one-piece annular plates each having a number of arms equal to half the number of blades, axially superposed and mounted reversed one against the other so that the centers of the articulations in the yokes at the ends of all the arms are in a common radial plane relative to said rotor axis (Z—Z).

7. A rotor according to claim 6, of the four-blade type, wherein each of the two identical one-piece annular plates comprises two diametrally opposed radial arms in a cruciform arrangement relative to the two arms of the other one-piece annular plate.

8. A rotor according to claim 4 or 5 wherein said pitch control plate is fixed between two annular flanges projecting radially outwards, one on said sliding sleeve and the other on a tubular end-piece set into the axially outside end of said sliding sleeve.

9. A rotor according to claim 1 wherein said base is substantially frustoconical and converges towards said pylon, which said base connects to said inside plate of said hub.

10. A rotor according to claim 1 wherein said means retaining each blade to and articulating it on said hub comprises two rigid armatures one of which, in a radially outside position relative to said rotor axis (Z—Z), is fixed between said two plates of said hub and the other of which, at a radially inside position, is coupled to the corresponding blade root to move with it.

11. A rotor according to claim 10 wherein said root of each blade is coupled to move with the corresponding radially inside armature by a rigid loop attached to said blade root and continuously surrounding said retaining and articulation means, being attached to their radially inside armature.

12. A rotor according to claim 1, further comprising, for each blade, a flapping abutment device with direct bearing engagement of inside abutments on the same side as said pylon and outside abutments on the side opposite said pylon mounted on said blade root against respective inside and outside abutments mounted on said hub, respectively to limit negative and positive flapping of said blade, said inside and outside flapping abutments of said hub being disposed on radially outside edges, relative to said rotor axis (Z—Z), of said inside and outside plates of said hub, respectively, in parts of said plates between which said retaining and articulation means are housed.

13. A rotor according to claim 1 wherein said pitch lever on each blade projects laterally from a sleeve surrounding said blade root and attached thereto.

* * * * *